United States Patent
Lee (10) Patent No.: US 10,701,178 B2
(45) Date of Patent: Jun. 30, 2020

(54) METHOD AND APPARATUS OF WEB APPLICATION SERVER FOR BLOCKING A CLIENT SESSION BASED ON A THRESHOLD NUMBER OF SERVICE CALLS

(71) Applicant: SAMSUNG SDS CO., LTD., Seoul (KR)

(72) Inventor: Ju Ho Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 31 days.

(21) Appl. No.: 15/798,639

(22) Filed: Oct. 31, 2017

(65) Prior Publication Data
US 2018/0124204 A1 May 3, 2018

(30) Foreign Application Priority Data
Oct. 31, 2016 (KR) .................. 10-2016-0142765

(51) Int. Cl.
*H04L 29/08* (2006.01)
*H04L 29/06* (2006.01)

(52) U.S. Cl.
CPC .......... *H04L 67/32* (2013.01); *H04L 63/1458* (2013.01); *H04L 63/168* (2013.01);
(Continued)

(58) Field of Classification Search
CPC ... H04L 67/32; H04L 63/168; H04L 63/1458; H04L 67/141; H04L 67/22; H04L 67/42
See application file for complete search history.

(56) References Cited

U.S. PATENT DOCUMENTS 6,944,167 B1 * 9/2005 McPherson ....... H04L 29/12066
370/401
8,041,824 B1 * 10/2011 Maeng ................... H04L 63/10
709/229
(Continued)

FOREIGN PATENT DOCUMENTS

JP 2006246109 A 9/2006
JP 4961996 B2 6/2012
(Continued)

OTHER PUBLICATIONS

Communication dated Feb. 19, 2018, issued by the Korean Intellectual Property Office in corresponding Korean Application No. 10-2016-0142765.
(Continued)

*Primary Examiner* — Daniel C. Murray
(74) *Attorney, Agent, or Firm* — Sughrue Mion, PLLC (57) ABSTRACT

A client session blocking method performed by a client session blocking apparatus includes receiving a first request of a client for a service from a web server, performing a first determination regarding whether a session of the client for the service is valid, in response to the first determination indicating that the session is valid, performing a second determination regarding whether a number of consecutive calls for the service is equal to or greater than a predetermined threshold number of calls for the service and in response to the second determination indicating that the number of the consecutive calls is equal to or greater than the predetermined threshold number, and blocking the session of the client for the service.

10 Claims, 7 Drawing Sheets

(52) U.S. Cl.
CPC ............ *H04L 67/141* (2013.01); *H04L 67/22* (2013.01); *H04L 67/42* (2013.01)

(56) References Cited

U.S. PATENT DOCUMENTS

| | | | | |
|---|---|---|---|---|
| 8,667,056 | B1* | 3/2014 | Proulx | H04L 67/325 |
| | | | | 370/229 |
| 9,002,194 | B2 | 4/2015 | Xia et al. | |
| 9,071,576 | B1* | 6/2015 | Earl | H04L 63/0236 |
| 9,246,825 | B2 | 1/2016 | Jilani et al. | |
| 9,313,604 | B1* | 4/2016 | Holcombe | H04W 28/06 |
| 9,357,431 | B2 | 5/2016 | Paladugu et al. | |
| 10,044,729 | B1* | 8/2018 | Astakhova | H04L 63/105 |
| 2002/0107953 | A1* | 8/2002 | Ontiveros | H04L 43/06 |
| | | | | 709/224 |
| 2004/0073704 | A1* | 4/2004 | Paunikar | H04L 29/12367 |
| | | | | 709/245 |
| 2005/0076335 | A1* | 4/2005 | Cavage | G06F 9/3851 |
| | | | | 718/100 |
| 2006/0072542 | A1* | 4/2006 | Sinnreich | H04L 12/2854 |
| | | | | 370/351 |
| 2006/0146862 | A1* | 7/2006 | Lee | H04L 47/10 |
| | | | | 370/448 |
| 2007/0200915 | A1* | 8/2007 | Lee | H04W 4/10 |
| | | | | 348/14.01 |
| 2008/0298333 | A1* | 12/2008 | Seok | H04W 8/005 |
| | | | | 370/338 |
| 2010/0131668 | A1* | 5/2010 | Kamath | H04L 47/32 |
| | | | | 709/233 |
| 2011/0153724 | A1* | 6/2011 | Raja | H04L 67/325 |
| | | | | 709/203 |
| 2012/0124144 | A1* | 5/2012 | Woley | H04L 51/12 |
| | | | | 709/206 |
| 2012/0180021 | A1* | 7/2012 | Byrd | G06F 21/45 |
| | | | | 717/100 |
| 2013/0152153 | A1* | 6/2013 | Weiser | H04L 63/0236 |
| | | | | 726/1 |
| 2014/0047114 | A1* | 2/2014 | Chokshi | H04L 67/08 |
| | | | | 709/225 |
| 2014/0086146 | A1* | 3/2014 | Kim | H04W 28/02 |
| | | | | 370/328 |
| 2014/0250233 | A1* | 9/2014 | Webster | H04L 67/1097 |
| | | | | 709/227 |
| 2015/0026334 | A1* | 1/2015 | Choi | H04L 43/0876 |
| | | | | 709/224 |
| 2015/0124780 | A1* | 5/2015 | Ode | H04W 36/32 |
| | | | | 370/331 |
| 2016/0088014 | A1* | 3/2016 | Chandran | H04L 63/1466 |
| | | | | 726/23 |
| 2016/0088184 | A1* | 3/2016 | Nakagawa | H04N 1/32765 |
| | | | | 358/1.15 |

FOREIGN PATENT DOCUMENTS

| | | |
|---|---|---|
| KR | 101041997 B1 | 6/2011 |
| KR | 1020110116962 A | 10/2011 |
| KR | 1020110122432 A | 11/2011 |
| KR | 1020110136170 A | 12/2011 |
| KR | 101116745 B1 | 2/2012 |
| KR | 101206921 B1 | 11/2012 |
| KR | 101500678 B1 | 3/2015 |

OTHER PUBLICATIONS

Communication dated Mar. 27, 2018, from the European Patent Office in counterpart European Application No. 17199182.1.

* cited by examiner

METHOD AND APPARATUS OF WEB APPLICATION SERVER FOR BLOCKING A CLIENT SESSION BASED ON A THRESHOLD NUMBER OF SERVICE CALLS

APPLICATION SERVER

This application claims the benefit of Korean Patent Application No. 10-2016-0142765, filed on Oct. 31, 2016, in the Korean Intellectual Property Office, the disclosure of which is incorporated herein by reference in its entirety.

BACKGROUND

1. Field

The present inventive concept relates to a client session blocking method and apparatus, and more particularly, to a method and apparatus for blocking a session of a client that generates an abnormal bulk call in a system.

2. Description of the Related Art

Various web application services such as web mail, web messenger, blog and portal system are being provided to clients in the Internet or intranet environment. When an abnormal bulk call is generated by a client in such a web application execution environment, the load on a web application server (WAS) and a database (DB) may increase rapidly, resulting in a service failure.

To prevent such a service failure for system stability, a client that generates an abnormal bulk call may be identified individually, and the cause of the bulk call may be removed. However, this method requires manual action of a user on the client side. If the action is not taken in a timely manner, the risk of the service failure persists.

As another way to ensure system stabilization, the access of a client, which generates a bulk call, to a web server may be blocked using an access control list (ACL) policy. However, this method cannot prevent the client that generates the bulk call from accessing a web server other than the web server to which the ACL policy is applied. Therefore, the method can delay the failure time but cannot be a fundamental solution.

As another way to ensure system stabilization, the bandwidth of a system for a client that generates an abnormal bulk call may be reduced using network equipment. In this method, however, since the client that generates the bulk call cannot be identified, a reduction in the bandwidth can result in a reduction in the bandwidth for all users of the system.

In order to avoid such a problem, the client that generates the bulk call may be identified using the client's Internet protocol OP) port, and then the bandwidth for the client may be reduced. Even in this case, however, it is impossible to take measures only on the client that generates the bulk call because the port of the client is changed every call.

Nevertheless, there is still no way to block access to the system by targeting only the client that generates the abnormal bulk call.

SUMMARY

Aspects of the inventive concept provide a method and apparatus for blocking a session of a client that generates an abnormal bulk call by using a servlet filter.

Specifically, aspects of the inventive concept provide a method and apparatus for determining whether a bulk call is abnormal based on temporal continuity of the bulk call by using a servlet filter and blocking an application session of a client that has generated the abnormal bulk call.

Aspects of the inventive concept also provide a method and apparatus for determining whether a number of calls equal to or greater than a threshold number of calls preset for each service of a web application have been generated and blocking a session of a client for the corresponding service based on the determination result.

Aspects of the concept also provide a method and apparatus for identifying a normal number of calls less than a threshold number of calls and changing the threshold number of calls, which is used to determine whether an abnormal bulk call has been generated, based on the identified normal number of calls.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a client session blocking method performed by a client session blocking apparatus, the method comprises receiving a first request of a client for a service from a web server, performing a first determination regarding whether a session of the client for the service is valid, in response to the first determination indicating that the session is valid, performing a second determination regarding whether a number of consecutive calls for the service is equal to or greater than a predetermined threshold number of calls for the service and in response to the second determination indicating that the number of the consecutive calls is equal to or greater than the predetermined threshold number, blocking the session of the client for the service.

According to another aspect of the inventive concept, there is provided a client session blocking apparatus, the apparatus comprises one or more processors, a network interface, a memory configured to load a computer program to be executed by the processors; and a storage which stores the computer program, wherein the computer program comprises instructions to perform an operation of receiving a first request of a client for a service from a web server, an operation of performing a first determination regarding whether a session of the client for the service is valid, an operation of performing a second determination regarding whether a number of consecutive calls for the service is equal to or greater than a predetermined threshold number in response to the first determination indicating that the session is valid and an operation of blocking the session of the client for the service in response to the second determination indicating that the number of the consecutive calls is equal to or greater than the predetermined threshold number.

According to another aspect of the inventive concept, there is provided a non-transitory computer-readable medium configured to store a computer program which, when executed, causes a computing apparatus to receive a first request of a client for a service from a web server, perform a first determination regarding whether a session of the client for the service is valid, in response to the first determination indicating that the session is valid, perform a second determination regarding whether a number of consecutive calls for the service is equal to or greater than a predetermined threshold number and in response to the second determination indicating that the number of the consecutive calls is equal to or greater than the predetermined threshold number, block the session of the client for the service.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, embodiments of the inventive concept will be described in greater detail with reference to the attached drawings.

Figure 1:
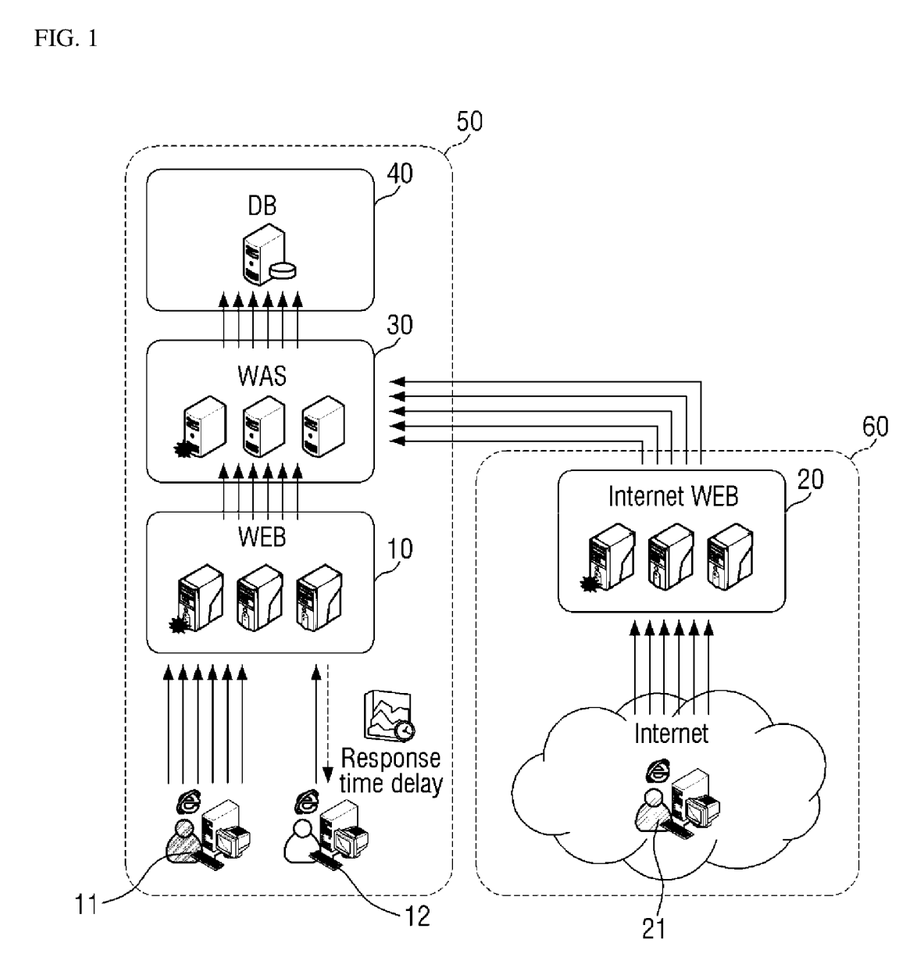
FIG. 1 illustrates the configuration of a bulk call generation system according to an embodiment.

FIG. 1 illustrates the configuration of a bulk call generation system according to an embodiment.

Referring to FIG. 1, the bulk call generation system may include one or more servers 10, 20 and 30, a plurality of clients 11, 12 and 21, and a database 40 connected to web services and web applications provided by the servers 10, 20 and 30.

The servers 10, 20 and 30 may include web servers 10 and 20 which can communicate with clients and a web application server 30 which connects the web servers 10 and 20 to the database 40.

In particular, the web servers 10 and 20 can be divided into the web server 10 and the Internet web server 20 according to the network environment. According to an embodiment, the web server 10 may be a server that provides a web service in an intranet environment 50. In particular, the web server 10 may be a server that provides a business portal system service through a company network.

The Internet web server 20 is a server that provides a web service in an Internet environment 60. In particular, the Internet web server 20 may be a server that provides a business portal system service through an external public network.

The web application server 30 provides a connection between the execution environment of a web application and the database and may manage a plurality of transactions related to the web services provided through the web servers 10 and 20. In addition, the web application server 30 may execute business logic that processes a task.

Each of the web server 10, the Internet web server 20, and the web application server 30 may be a computing device capable of performing network communication and may be, for example, a fixed server device. The functions of the web server 10, the Internet web server 20, and the web application server 30 are not limited to the above-described functions, and various functions performed by web servers and web application servers in the technical field of the inventive concept can be performed.

The clients 11, 12 and 21 are computing devices capable of communicating with the web servers 10 and 20 and the web application server 30 via a network.

In particular, each of the clients 11, 12 and 21 may be any one of mobile terminals such as a smart phone, a laptop computer, a digital broadcasting terminal, a personal digital assistant (PDA), a portable multimedia player (PMP), a navigation device, a slate PC, a tablet PC, a wearable device, a smart watch, a head mounted display (HMD), and a virtual reality (VR) device. In addition, each of the clients 11, 12 and 21 may be any one of fixed computing devices such as a server device, a digital TV, a desktop computer, and a digital signage.

Bulk call situations according to an embodiment will now be described. It is assumed that the client 11 is a malicious client that generates an abnormal bulk call in the intranet environment 50 and the client 12 is a normal client that generates a normal call. It is also assumed that the client 21 is a malicious client that generates an abnormal bulk call in the Internet environment 60.

An abnormal bulk call can be caused by a variety of situations such as a bug in an application running on a client, a program error, arbitrary finning of a load measurement program, a client program coding error of a linked system, and a state in which a certain button on a client's input unit is kept physically pressed.

For example, the malicious client 11 in the intranet environment 50 may generate a bulk call for requesting the same uniform resource locator (URL) repeatedly. In this case, a load may be put on the web server 10, and the central processing unit (CPU) usage of the web application server 30 may increase, thereby increasing the usage of the database 40. This may result in a response time delay for a service request of the normal client 12 or a service failure.

In another example, when the malicious client 21 of the Internet environment 60 makes a denial-of-service (DoS) attack, the load of the Internet web server 20 and the web application server 30 increases. Accordingly, as in the above example, the usage of the database 40 is rapidly increased, and a response time delay problem or a service failure occurs to the normal client 12 of the intranet environment 50. In this case, although not illustrated in the drawing, the response time delay problem or the service failure may also occur to a normal client of the Internet environment 60.

Accordingly, there is a need for a system that automatically performs system stabilization in preparation for the above example bulk call generation situations. As an example of the system that automatically performs system stabilization, a client session blocking system according to an embodiment can be provided. The client session blocking system refers to the above-described bulk call generation system in which a client session blocking apparatus is installed. This will be described later with reference to FIG. 6.

Figure 2:
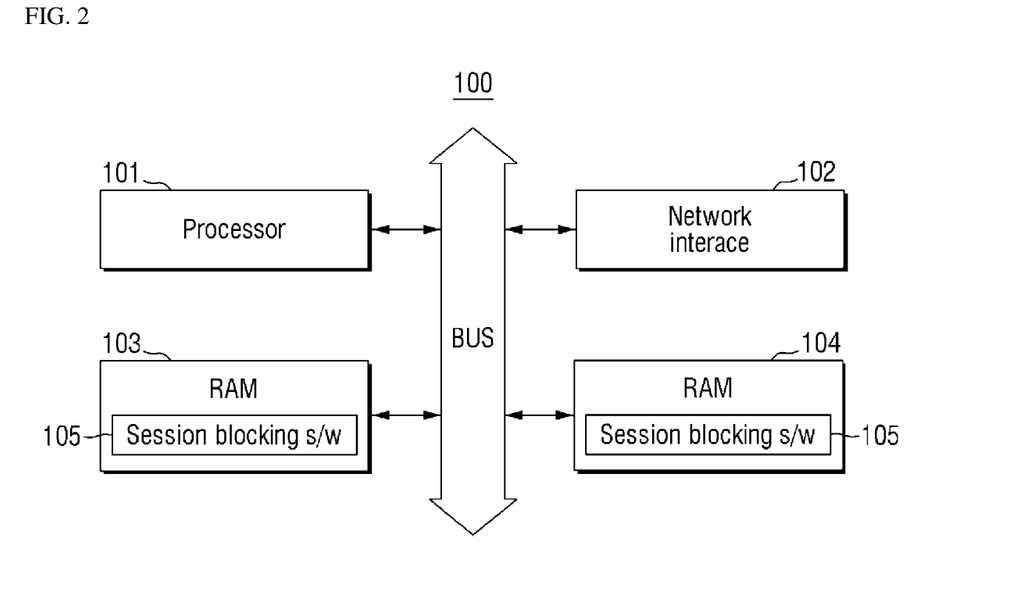
FIG. 2 illustrates the hardware configuration of a client session blocking apparatus according to an embodiment.

The detailed configuration and operation of the client session blocking apparatus for the client session blocking system will now be described with reference to FIG. 2. FIG. 2 illustrates the hardware configuration of a client session blocking apparatus 100 according to an embodiment.

Referring to FIG. 2, the client session blocking apparatus 100 includes one or more processors 101, a network interface 102, a memory 103 which loads a computer program 105 to be executed by the processors 101, and a storage 104 which stores the computer program 105.

The processors 101 control the overall operation of each component of the client session blocking apparatus 100. The processors 101 may include a CPU, a microprocessor unit (MPU), a microcontroller unit (MCU), or any type of processor well known in the art to which the inventive concept pertains. In addition, the processors 101 may perform an operation on at least one application or program for performing a method according to embodiments. The client session blocking apparatus 100 may include one or more processors.

The network interface 102 supports wired/wireless Internet communication or intranet communication of the client session blocking apparatus 100. In addition, the network interface 102 may support various communication methods other than the Internet communication and the intranet communication. To this end, the network interface 102 may include a communication module well known in the art.

The network interface 102 may be connected to the web application execution environment of the web servers 10 and 20 through a network and may also be connected to the database 40.

The memory 103 stores various data, commands and/or information. The memory 103 may load one or more programs 105 from the storage 104 to execute a client session blocking method according to embodiments. In FIG. 2, a random access memory (RAM) is illustrated as an example of the memory 103.

The storage 104 may non-temporarily store the programs 105. In FIG. 2, session blocking software 105 is illustrated as an example of the programs 105. Also, although not illustrated in the drawing, the storage 104 may store various settings according to an embodiment, such as settings for a threshold number of calls and settings for a time range. In addition, the storage 104 may store the threshold number of calls per network and the count information of consecutive calls.

The storage 104 may include a nonvolatile memory such as a read only memory (ROM), an erasable programmable ROM (EPROM), an electrically erasable programmable ROM (EEPROM) or a flash memory, or may include a hard disk, a removable disk, or any type of computer-readable recording medium well known in the art to which the inventive concept pertains.

The session blocking software 105 may be executed by the processors 101 to perform one or more operations for performing functions and/or operations of the client session blocking apparatus 100. This will be described later with reference to FIGS. 3 and 4.

Operations performed by the execution of the session blocking software 105 of the processors 101 will be described later with reference to FIGS. 3 and 4.

The client session blocking apparatus 100 may further include various components related to the embodiment, in addition to the components illustrated in FIG. 2. For example, the client session blocking apparatus 100 may include a display unit for informing a system administrator of the occurrence of a bulk call situation and an input unit for receiving a setting related to the threshold number of calls from the system administrator.

According to an embodiment, the client session blocking apparatus 100 may be a physical device installed in the web application server 30 or may be a device sharing some components with the web application server 30. According to an embodiment, the client session blocking apparatus 100 may be the web application server 30 in which the session blocking software 105 is installed.

Figure 3:
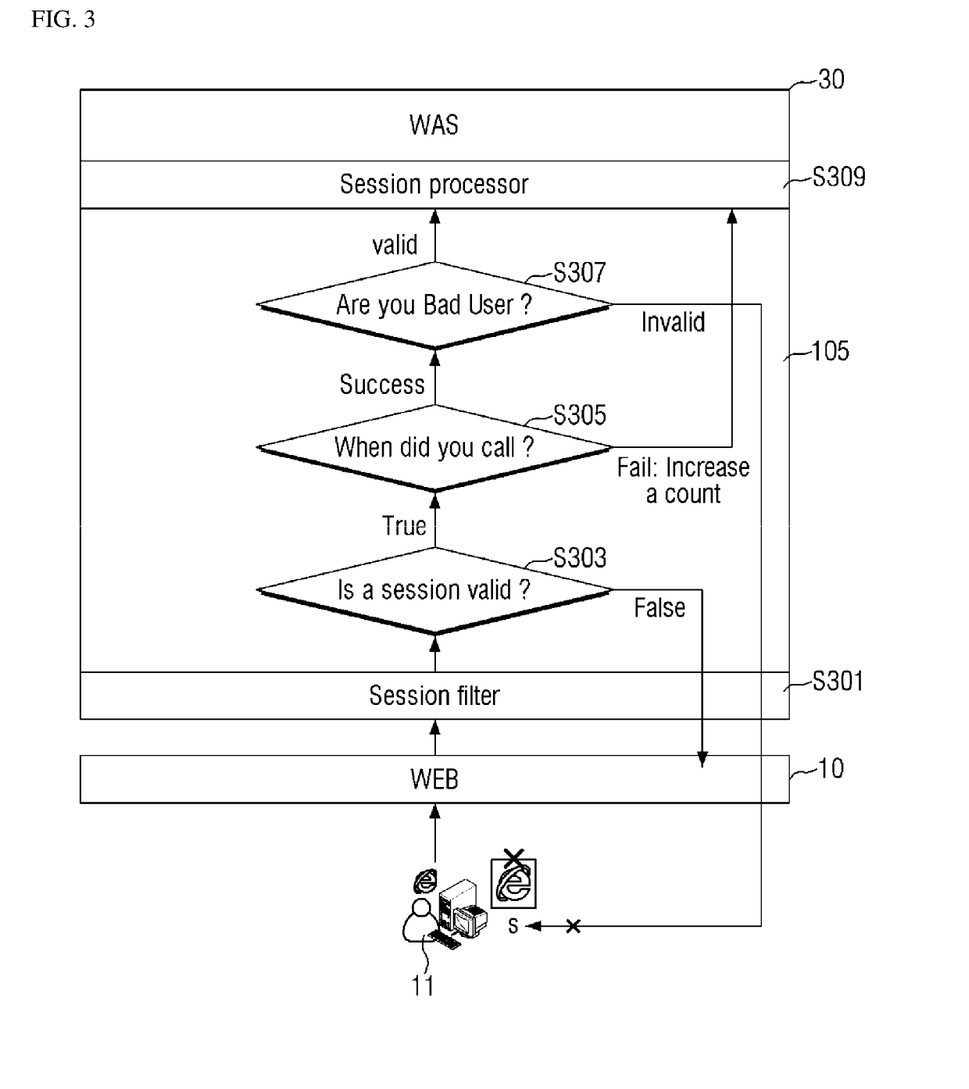
FIG. 3 is a diagram for explaining the functions of the client session blocking apparatus according to an embodiment.

FIG. 3 is a diagram for explaining the functions of the client session blocking apparatus 100 according to an embodiment.

In particular, in FIG. 3, the web application server 30 in which the session blocking software 105 is installed is illustrated as an example of the client session blocking apparatus 100.

The web application server 30 may include a servlet filter. According to an embodiment, the servlet filter may determine whether a client's session is valid particularly for a service requested by the client. The servlet filter may also identify information about the time when the client's session for the requested service was created and the time when the service was requested. Since the servlet filter determines whether a session is valid and identifies information, it will hereinafter be referred to as a session filter. In FIG. 3, the client session blocking apparatus 100 is the web application server 30 in which the session blocking software 105 is installed, and the session blocking software 105 may be integrated into the session filter f the web application server 30.

Referring to FIG. 3, the client session blocking apparatus 100 may include a session filter which receives a request of a client 11 from the web server 10 and a session processor which finally determines whether to block a session according to the execution of the session blocking software 105.

When the service filter receives a request for a service from the web server 10 (operation S301), the client session blocking apparatus 100 may determine whether a session of a client requesting the service is valid by using the session filter (operation S303) If the session is not valid, the en session blocking apparatus 100 terminates the service request.

On the other hand, if the session is valid, the client session blocking apparatus 100 may identify the time when the service was requested by the client, that is, the time when the service was called (operation S305). According to the functions of the session filter described above, the servlet filter can identify information about the time when a service was requested. Therefore, the client session blocking apparatus 100 can identify how frequently the service request was received. Specifically, the client session blocking apparatus 100 can determine whether the service request is a malicious client's call consecutive to a previous call.

According to an embodiment, when determining that the service request is a normal client's call not consecutive to a previous call, the client session blocking apparatus 100 initializes the number of consecutive calls and counts the service request as one call. That is, the result of calculating the number of consecutive calls is one.

According to an embodiment, when determining that the service request is a malicious client's call consecutive to the previous call, the client session blocking apparatus 100 may add one to the accumulated number of consecutive calls and determine whether the added number of consecutive calls is equal to or greater than a threshold number of calls.

That is, the client session blocking apparatus 100 may determine whether the service request is a call included in a bulk call because the added number of consecutive calls is equal to or greater than the threshold number of calls (operation S307). If the number of consecutive calls is equal to or greater than the threshold number of calls, the client session blocking apparatus 100 determines that the client requesting the service is a malicious client that has generated an abnormal bulk call and terminates the client's session by using the session processor.

On the other hand, if the number of consecutive calls is less than the threshold number of calls, the client session blocking apparatus 100 maintains the session of the client using the session processor and accepts the request of the user (operation S309). Accordingly, the web application server 30 provides a connection between an application of the client and the database 40.

Operations S301 through S309 of the client session blocking apparatus 100 and the functions of the session filter and the session processor may be software module units executed by the processors 101 of the client session blocking apparatus 100. Alternatively, each operation and component may be a region and/or unit of hardware such as a Field Programmable Gate Array (FPGA) or Application Specific Integrated Circuit (ASIC). However, the above components are not limited to software or hardware components. Each component may advantageously be configured to reside on the addressable storage medium and configured to execute on one or more processors. The functionality provided for in the components may be combined into fewer components or further separated into additional components.

The operation of the client session blocking apparatus 100 will be described in more detail with reference to FIGS. 4 and 5. It is assumed that each of the following operations is performed by the client session blocking apparatus 100.

Figure 4:
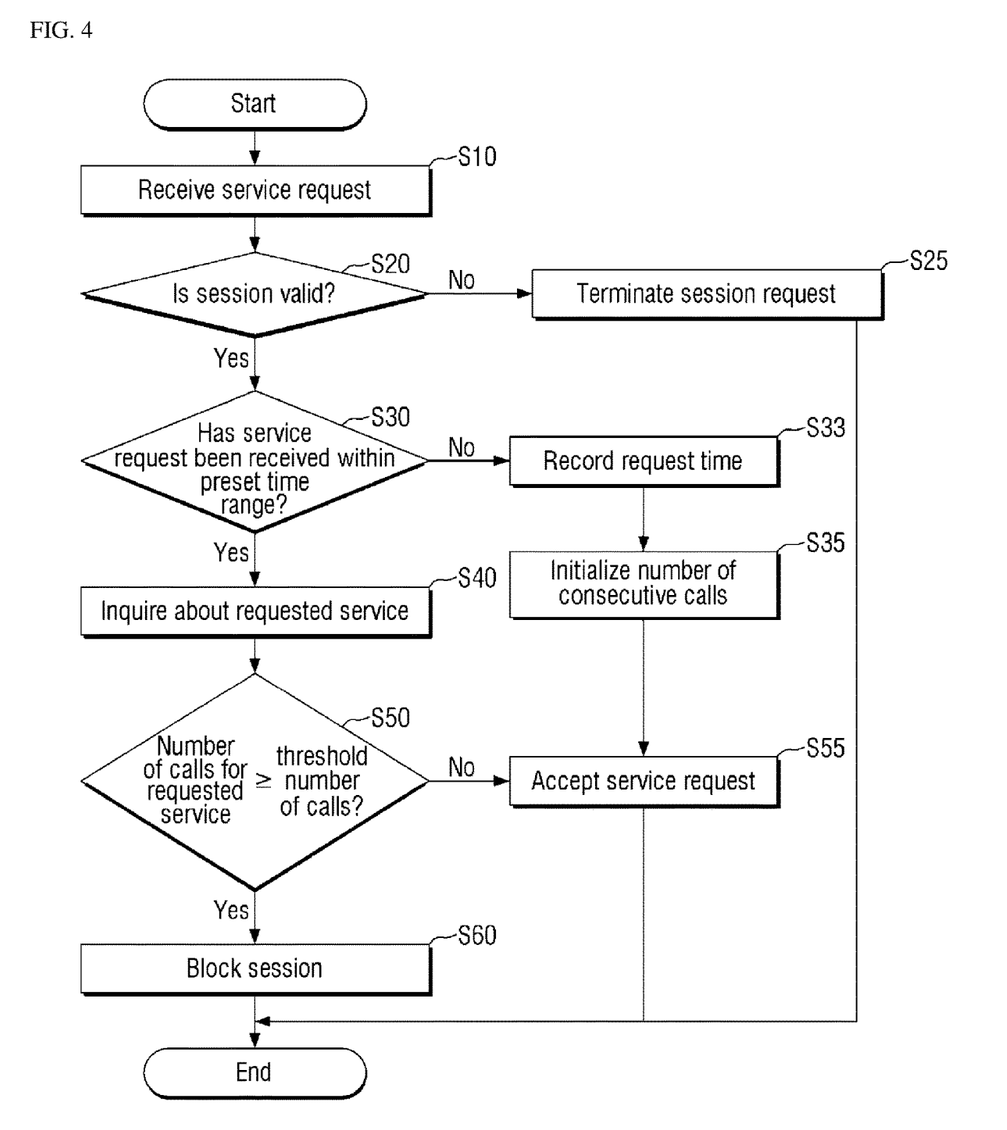
FIG. 4 is a flowchart illustrating a client session blocking method according to an embodiment.

FIG. 4 is a flowchart illustrating a client session blocking method according to an embodiment. It is assumed that the client session blocking apparatus 100 is the application web server 30 in which session blocking software according to an embodiment is applied to the session filter.

Referring to FIG. 4, when a client 11 requests a service, the web server 10 sends the request to the web application server 30. Accordingly, the client session blocking apparatus 100 may receive a first request of the client for the service from the web server 10 (operation S10).

The client session blocking apparatus 100 may determine whether the client's session for the service is valid (operation S20). Here, the determination about the validity of the session in operation S20 is referred to as a first determination in order to distinguish this determination from a determination (hereinafter, referred to as a second determination) about whether the session should be blocked.

Specifically, in operation S20, the client session blocking apparatus 100 may determine whether a client session of a web application providing the service is valid. For example, if the service request is an Internet connection request for web browsing the client session blocking apparatus 100 may determine whether a session of a web application performing web browsing is valid. In the above example, the web application may be a web browser such as Internet Explorer or Chrome.

If the session is not valid as a result of the first determination, the client session blocking apparatus 100 terminates the service request (operation S25).

On the other hand, if the session is valid as a result of the first determination, the client session blocking apparatus 100 may determine whether the first request has been received within a preset time range from a second request for the service received prior to the reception of the first request (operation S30).

That is, when the first request is an $N^{th}$ request, the second request for the service is an $(N-1)^{th}$ request. The client session blocking apparatus 100 may determine whether the $N^{th}$ request has been received within the preset time range from the $(N-1)^{th}$ request.

For example, if the preset time range is 1 second, the client session blocking apparatus 100 may identify a time interval between the reception of the $N^{th}$ request for the service and the reception of the $(N-1)^{th}$ request for the service and determine whether the identified time interval is within 1 second.

When determining that the first request has been received within the preset time range, the client session blocking apparatus 100 may identify the threshold number of calls preset for the service. Specifically, the client session blocking apparatus 100 may inquire about the requested service (operation S40) and identify the threshold number of calls preset for the service. Here, the threshold number of calls is a criterion for judging whether a service request repeatedly called within a preset time range corresponds to an abnormal bulk call.

The threshold number of calls may be set differently for each type of service and for each network, to which a client is connected, by the administrator or automatically by the client session blocking apparatus 100. For example, the threshold number of calls may be set to 10 for a web mail service provided through the intranet and 5 for a web mail service provided through the Internet. In addition, the threshold number of calls may be set to 3 for an administrator page for analyzing various statistics of a web application server provided through the intranet and may be set to 1 for an administrator page provided through the Internet.

In some cases, setting the threshold number of calls may not be available for a service that has no possibility for generation of a bulk call.

Next, the client session blocking apparatus 100 may make the second determination about whether the number of consecutive calls for the service is equal to or greater than the threshold number of calls preset for the service (operation S50).

If the second determination indicates that the number of consecutive calls for the service is less than the threshold number of calls preset for the service, the client session blocking apparatus 100 accepts the service request of the client (operation S55).

In addition, if the second determination indicates that the number of calls for the service is less than the threshold number of calls preset for the service, the client session blocking apparatus 100 may calculate the difference between the number of consecutive calls and the threshold number of calls. If the calculated difference is within a preset range, the client session blocking apparatus 100 may change the threshold number of calls.

For example, when the number of consecutive calls for the service is 9 and the preset threshold number of calls is 10, the calculated difference between the number of consecutive calls and the preset threshold number of calls is 1. That is, the client session blocking apparatus 100 may not determine the nine consecutive service requests as an abnormal bulk call. However, only one request is left before the number of calls for blocking the client's session. In some cases, although a client generates normal service requests, the client session blocking apparatus 100 may detect that a number of consecutive calls close to the threshold number of calls have been generated and determine that the system is unstable.

Such cases may occur when a change in the setting for the threshold number of calls is required due to a change in the system usage environment or the service environment. That is, if 8 to 9 service requests are called even when a service is called normally, 10 calls set as the threshold number of calls may be too strict because the number of service requests can be increased or decreased by 10 to 20% depending on the service usage environment.

Therefore, in the above cases, the client session blocking apparatus 100 may automatically change the threshold number of calls. Here, if the number of consecutive calls is close to the threshold number of calls frequently, that is, a preset number of times or more, the client session blocking apparatus 100 may increase the threshold number of calls. The increase in the threshold number of calls may be determined according to the setting of the administrator.

If the second determination in operation S50 indicates that the number of consecutive calls for the service is greater than or equal to the threshold number of calls preset for the service, the client session blocking apparatus 100 may block the client's session for the service (operation S60).

For example, it is assumed that the service is a web mail service, the preset time range is 1 second, and the preset threshold number of calls identified in operation S40 is 10. In this case, if the client requests the mail service 10 times or more within 1 second, when the tenth service request is called within 1 second, the client session blocking apparatus 100 may determine that an abnormal bulk call has been generated. That is, the client session blocking apparatus 100 may determine the client requesting the web mail service as a malicious client and block the client's session for the web mail service.

However, if the client requests the mail service 5 times, which is less than 10 times, within 1 second, the client session blocking apparatus 100 may accept the mail service request of the client.

If determining in operation S30 that the first request has not been received within the preset time range, the client session blocking apparatus 100 may record the time when the first request was received (operation S33).

As in the above example, it is assumed that the first request is an $N^{th}$ request and the second request is an $(N-1)^{th}$ request. If the $N^{th}$ request is received more than 1 second, which is the preset time range, after the $(N-1)^{th}$ request, the client session blocking apparatus 100 may record the time when the $N^{th}$ request was received and determine that the $N^{th}$ request is a call independent from the $(N-1)^{th}$ request. That is, it may be determined that the $N^{th}$ request is not a call consecutive to the $(N-1)^{th}$ request.

When determining that the $N^{th}$ service request is an independent call, the client session blocking apparatus 100 may initialize a record of the number of consecutive calls which reflects the second request (operation S35). That is, even if the service requests up to the $(N-1)^{th}$ service request are determined as consecutive calls, if the $N^{th}$ service request is called after the preset time range from the $(N-1)^{th}$ service request, the client session blocking apparatus 100 determines that the $N^{th}$ service request is irrelevant to the $(N-1)^{th}$ service request and does not determine that an abnormal bulk call has been generated.

In the above example, when the threshold number of calls is 10, if the service requests up to the ninth service request are determined as consecutive calls, the recorded number of consecutive calls has a value of 9. In this case, if the tenth service requests called 2 seconds (exceeding 1 second) after the ninth service request was called, the client session blocking apparatus 100 initializes the number of consecutive calls to 9 and determines the tenth service request, which was received as the first request, as a first service request. That is, the client session blocking apparatus 100 newly starts counting the number of consecutive calls.

While a case where it is determined in operation S30 that the first quest has not been received within the preset time range has been mainly described, a case where it is determined that the first service request of the client has been received within the preset time range will now be described with reference to FIG. 5.

Figure 5:
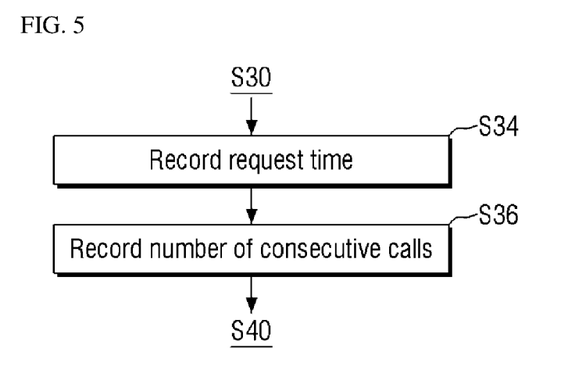
FIG. 5 is a flowchart illustrating a method of counting the number of consecutive calls, which is referred to in some embodiments.

FIG. 5 is a flowchart illustrating a method counting the number of consecutive calls, which is referred to in some embodiments.

Referring to FIG. 5, when determining in operation S30 that the first request has been received within the preset time range, the client session blocking apparatus 100 may record the time when the first request was received (operation S34).

As in the above example, is assumed that the first request is an $N^{th}$ request and the second request is an $(N-1)^{th}$ quest. If the $N^{th}$ request is received within 1 second, hich is the preset time range, after the $(N-1)^{th}$ request, h client session blocking apparatus 100 may record the tune when the $N^{th}$ request was received and determine that the $N^{th}$ request is a call consecutive to the $(N-1)^{th}$ request.

The client session blocking apparatus 100 may reflect the first request in a record of the number of consecutive calls which reflects the second request (operation S36).

In the above example, when the threshold number of calls is 10, if the service requests up to the ninth service request are determined as consecutive calls, the recorded number of consecutive calls has a value of 9. In this case, if the tenth service request is called 0.5 seconds (less than 1 second)

after the ninth service request was called, the client session blocking apparatus 100 increases the number of consecutive calls to 10 by reflecting the tenth service request in the number of consecutive calls of 9. That is, the client session blocking apparatus 100 accumulates the count of consecutive calls.

According to an embodiment, since the count accumulated up to the threshold number of calls is recorded in a log in operation S36, the administrator of the client session blocking apparatus 100 can effectively manage the threshold number of calls using a monitoring system linked with the client session blocking apparatus 100 and/or the web application server 30. The recorded log may be information such as a user ID, a company, a workplace and a service as well as the count of consecutive calls.

In this case, the client session blocking apparatus 100 may provide the recorded log to the monitoring system, thereby providing the administrator with information that can be used to adjust the threshold number of calls and information about the degree of risk per service.

In addition, based on the workplace information recorded in the log, the client session blocking apparatus 100 may, through the monitoring system, provide the administrator with information about whether the version of an application distributed in the workplace generates an abnormal call. In addition, the client session blocking apparatus 100 may detect that a specific client is operating abnormally in the workplace through the monitoring system and provide risk information of the specific client.

Next, the client session blocking apparatus 100 may identify the threshold number of calls for the service in operation S40 and determine whether the number of consecutive calls is equal to or greater than the threshold number of calls in operation S50.

Figure 6:
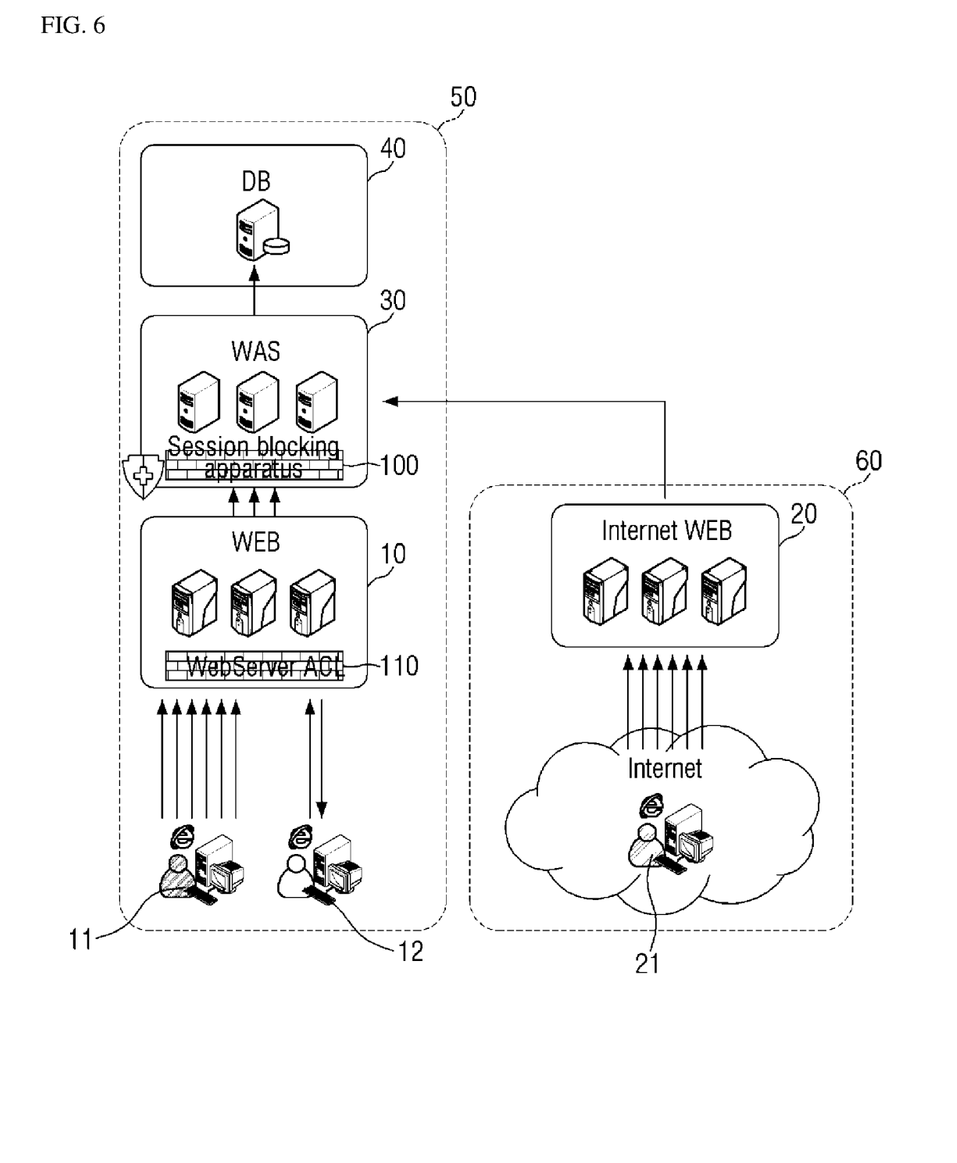
FIG. 6 is a diagram for explaining a case where the client session blocking apparatus is applied to a web application server of the bulk call generation system of FIG. 1 according to an embodiment.

FIG. 6 is a diagram for explaining a case where the client session blocking apparatus 100 is applied to the web application server 30 of the bulk call generation system of FIG. 1 according to an embodiment.

In FIG. 6, it is assumed that a client 11 is a malicious client that generates an abnormal bulk call in the intranet environment 50 and a client 21 is a malicious client that generates an abnormal bulk call in the Internet environment 60. In addition, a client 12 is a normal client of the intranet environment 50.

Referring to FIG. 6, when the client 11 generates an abnormal bulk call in the intranet environment 50, the web server 10 receives a service request repeated a threshold number of calls or more from the client 11 and sends the received service request to the web application server 30.

The web application server 30 may block a session of the client 11 for the requested service by using the client session blocking apparatus 100. Accordingly, the web application server 30 and the database 40 are protected from the bulk call of the client 11, and thus system stability is maintained. Therefore, a service failure does not occur to the normal client 12.

In addition, when the client 21 generates an abnormal bulk call in the Internet environment 60, the Internet web server 20 receives a service request repeated a threshold number of calls from the client 21 and sends the received service request to the web application server 30.

In this case, the web application server 30 may also block a session of the client 21 for the requested service by using the client session blocking apparatus 100. Accordingly, the web application server 30 and the database 40 are protected from the bulk call of the client 21, and thus system stability is maintained. Therefore, a service failure does not occur to the normal client 12.

As described above, a system in which an abnormal bulk call has been generated can be stabilized by applying only the client session blocking apparatus 100 to the web application server 30 without the need to additionally introduce network equipment other equipment into the system. That is, according to an embodiment, since it is unnecessary to introduce additional equipment in preparation for a bulk call, the cost of system stabilization can be reduced.

In order to stabilize the system, various methods other than applying the client session blocking apparatus 100 to the web application server 30 can be provided in the system. For example, the web server 10 may, by policy, restrict the access of a specific client at the level of the web server 10 by using an access control list 110.

According to an embodiment, the system stabilization methods may be used selectively or in combination with the client session blocking method.

As illustrated in FIG. 6, the client session blocking apparatus 100 of the client session blocking system may be connected to clients via a plurality of networks.

In particular, in operation S10, the client session blocking apparatus 100 may identify a network from which the first request was received. That is, the client session blocking apparatus 100 may identify whether the network from which the first request was received is the intranet environment 50 or the Internet environment 60.

In operation S40, the client session blocking apparatus 100 may identify the threshold number of calls preset for a service matched to the identified network. That is, the client session blocking apparatus 100 may, by policy, set the threshold number of calls differently according to the network. For example, since the reliability of the intranet environment 50 is relatively high, the threshold number of calls for the intranet environment 50 may be set relatively high. In addition, since the reliability of the Internet environment 60 is relatively low, the threshold number of calls for the Internet environment 60 may be set relatively low.

In operation S40, it may be identified that the threshold number of calls preset for the service is a first threshold number of calls in the case of a first network and a second threshold number of calls in the case of a second network.

In this case, if the identified network is the first network, the client session blocking apparatus 100 may make the second determination based on the first threshold number of calls in operation S50. If the identified network is the second network, the client session blocking apparatus 100 may make the second determination based on the second threshold number of calls.

For example, when the service is a web mail service, the first threshold number of calls may be preset to 10 if the first network is the intranet environment 50, and the second threshold number of calls may be preset to 7 if the second network is the Internet environment 60.

Therefore, if a client's service request has generated nine consecutive calls in the intranet environment 50, the client session blocking apparatus 100 may determine that a number of consecutive calls less than the preset threshold number of calls have been generated and accept the service request of the client.

On the other hand, if the same nine consecutive service requests are generated in the Internet environment 60, the client session interrupter 100 may determine in operation S50 that a number of consecutive calls equal to or greater than the preset threshold number of calls have been generated and terminate the session of the client.

According to an embodiment, the client session blocking apparatus 100 may automatically generate the threshold number of calls for a service request on a specific network.

In operation S10, the client session blocking apparatus 100 may identify whether the network from which the first request was received is the intranet or the Internet.

In this case, if the identified network is the Internet environment 60, the client session blocking apparatus 100 may identify the first threshold number of calls preset for a service matched to the intranet environment 50 in operation S40.

In the above example, when the client session blocking apparatus 100 identifies that the request for the web mail service was called in the Internet environment 60, it may identify the threshold number of calls preset for a case where the request for the web mail service is called in the intranet environment 50. That is, in the above example, the client session blocking apparatus 100 may identify the threshold number of calls of 10.

Based on the identified threshold number of calls of 10, the client session blocking apparatus 100 may generate the second threshold number of calls which is smaller than 10 by a preset value. For example, the client session blocking apparatus 100 may generate 7 calls, which are less than 10 calls, as the threshold number of calls for the web mail service request in the Internet environment 60. Here, the preset value may be determined by the administrator of the client session blocking apparatus 100.

Based on the second threshold number of calls, the client session blocking apparatus 100 may determine in operation S50 whether a number of consecutive calls equal to or greater than the threshold number of calls have been generated in the Internet environment 60.

Figure 7:
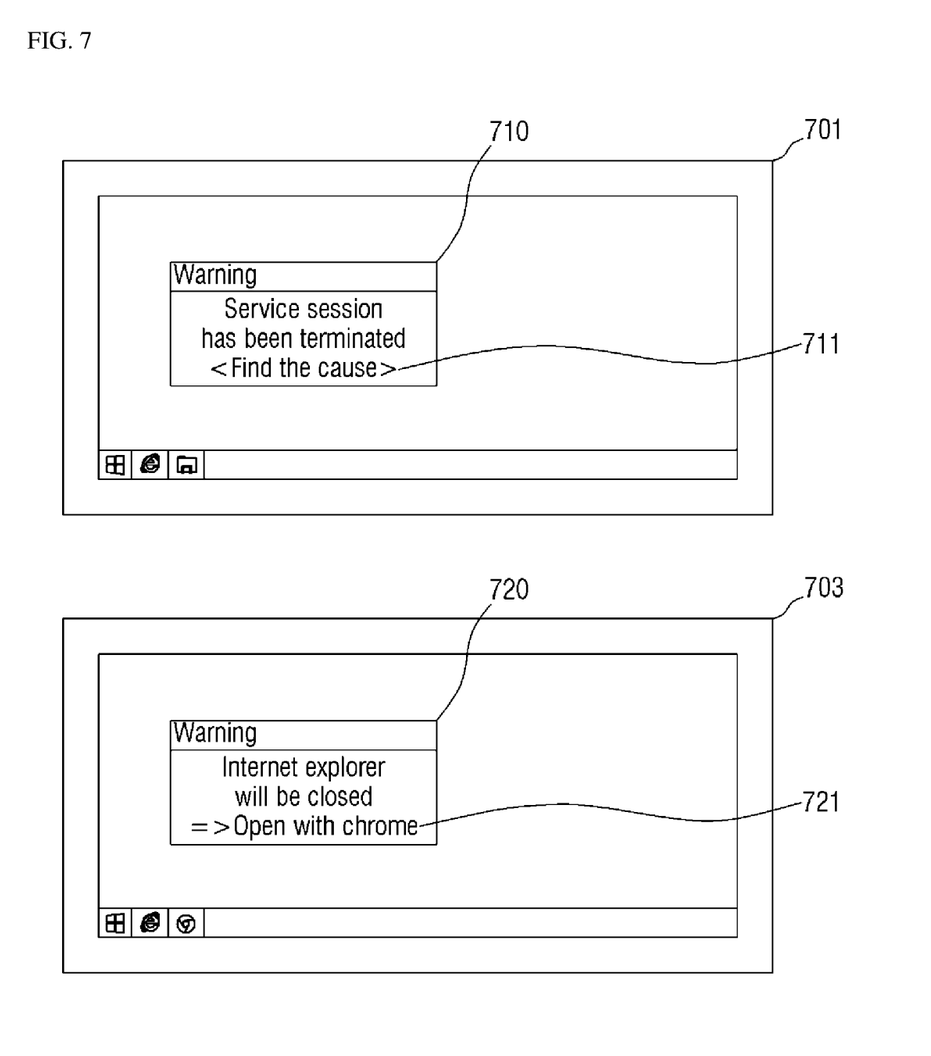
FIG. 7 illustrates examples of a user interface provided to a client after a session is blocked, which are referred to in some embodiments.

FIG. 7 illustrates examples of a user interface provided to a client after a session is blocked, which are referred to in some embodiments.

In operation S60, the client session blocking apparatus 100 may provide a user interface for informing a client that a session has been blocked through the web server 10 and/or the Internet web server 20.

In FIG. 7, user interfaces 701 and 703 are illustrated as examples.

Referring to the user interface 701, the client session blocking apparatus 100 may provide a notification 710 of the result of terminating a session for a service to a client that requested the service. In addition, the client session blocking apparatus 100 may provide information 711 indicating that the request for the service has generated a large number of calls equal to or greater than the threshold number of calls.

The client session blocking apparatus 100 may also suggest, through the user interface 701, the client to attempt to connect to the session for the service after a predetermined period of time.

According to an embodiment, the requested service may be a service that can be provided by executing either a first application or a second application. For example, the requested service may be web browsing, the first application may be Microsoft's Internet Explorer, and the second application may be Google's Chrome.

In operation S60, if the client's session for the service is a session of the first application, the client session blocking apparatus 100 may block the session of the first application. In the above example, the client session blocking apparatus 100 blocks a session of Internet Explorer.

That is, the client session blocking apparatus 100 may provide the result 720 of blocking the session of the first application for the service through the user interface 703.

In addition, the client session blocking apparatus 100 may provide information about the second application, which is preset and executable for the provision of the service, through the user interface 703.

Referring to the user interface 703, the client session blocking apparatus 100 may provide information 721 about Chrome which is the preset second application and may provide a link 721 to execute Chrome. To this end, the client session blocking apparatus 100 may pre-store information about one or more applications for providing the service.

When a request for executing the second application is received from the client, a session of the second application may be created, and the web application server 30 may receive information about the request and the session of the second application from the web server 10. In particular, the client session blocking apparatus 100 may identify the validity of the session, the session creation time, and the number of service requests, as described above with reference to FIG. 3.

Accordingly, if the number of service requests for the second application is less than a preset threshold number of calls, the client session blocking apparatus 100 may maintain the session and accept the service request.

According to an embodiment, the threshold number of calls may be set differently for each application linked to a service. For example, different threshold numbers of calls may be set for Internet Explorer and Chrome.

According to an embodiment, the threshold number of calls may be set differently for each version of the same application linked to a service. For example, the threshold number of calls may be set differently for each version of Internet Explorer.

That is, according to an embodiment, even if a session of a specific application for a service is blocked due to an unknown cause, a client can create a session using another application and receive the same kind of service as the above service.

In addition, according to an embodiment, even if a session of a specific application for a service is blocked, a client can create a new session and receive the same kind of service as the above service through the new session of the specific application.

For example, the client's session for the service may be a session of Internet Explorer, and an abnormal bulk call may be generated as a result of a service request for Internet Explorer.

In this case, the client session blocking apparatus 100 may block the session of Internet Explorer in operation S60. Then, when the client newly executes Internet Explorer, that is, when the client makes a service request by executing a new window, a session for Internet Explorer of the new window is newly created. Accordingly, the web application server 30 may receive information about the new session from the web server 10.

Therefore, the client session blocking apparatus 100 may identify the validity of the new session, the creation time of the new session, and the number of service requests made through the new session. In addition, if the number of service requests made through the new session is less than the preset threshold number of calls, the client session blocking apparatus 100 may maintain the new session and accept the service request. That is, even if a session of a specific application for a service is blocked due to an unknown cause, the client can create a new session using the specific application and receive the same kind of service as the above service.

On the other hand, in the above example, if the number of service requests made through the new session is equal to or greater than the threshold number of calls, the client session blocking apparatus 100 may block the new session in operation S60.

Until now, the method of blocking a session of a client that generates an abnormal bulk call by using the client session blocking apparatus 100 has mainly been described.

According to an embodiment, the client session blocking apparatus 100 may terminate a service itself as well as a session for the service.

For example, when a service requested by a client is a web browsing service, if an abnormal bulk call is generated for the web browsing service, the client session blocking apparatus 100 may terminate a web browser as well as a session of the web browser for the web browsing service. To this end, the client session blocking software of the client session blocking apparatus 100 may further include a single sign-on (SSO) module. The SSO module may be a client module capable of registering, in particular, an ID of a service. That is, the client module can register the ID of the web browser when logging into the web browser. In this case, if an abnormal bulk call is generated for the web browser, the client session blocking apparatus 100 may forcibly terminate the web browser itself as well as the session of the web browser.

According to the embodiments described above, a system can be automatically stabilized without manual action of a user on the client side.

In addition, according to the embodiments, it is possible to prevent a service failure by blocking an abnormal bulk call without setting on an access control list of a web server.

Also, according to the embodiments, even when a bulk call is generated, the system can be stabilized without introducing network equipment. Accordingly, since there is no need to purchase additional network equipment or additional equipment to stabilize the system, the cost of system stabilization can be reduced.

In addition, according to the embodiments, the system can be stably maintained without damaging normal users due to modification of a network bandwidth.

Furthermore, according to the embodiments, since only an application session of a client that has generated a bulk call is blocked, the client can receive the same kind of service through another application.

However, the effects of the embodiments are not restricted to the one set forth herein. The above and other effects of the embodiments will became more apparent to one of daily skill in the art to which the embodiments pertain by referencing the claims.

The concepts of the invention described above with reference to FIGS. 3 to 7 can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A client session blocking method performed by a client session blocking apparatus, the method comprising:
receiving a first request of a client for a service executable by one of a first application and a second application, from a web server;
in response to a session of the client being a session of the first application, performing a first determination regarding whether the session of the client for the first application is valid;
in response to the first determination indicating that the session of the first application is valid, performing a second determination regarding whether a number of consecutive calls for the session of the first application is equal to or greater than a predetermined threshold number of calls for the service; and
in response to the second determination indicating that the number of the consecutive calls is equal to or greater than the predetermined threshold number, blocking the session of the first application, and maintaining a session of the second application,
wherein the receiving of the first request comprises determining whether a type of a network from which the first request was received is an Internet,
wherein the performing of the second determination comprises:
in response to determining that the type of the network is the Internet, determining a first threshold number corresponding to an intranet;
generating a second threshold number based on the determined first threshold number, wherein the second threshold number is smaller than the first threshold number by a predetermined value, and
performing the second determination based on the second threshold number.

2. The method of claim 1, wherein the performing of the second determination comprises:
determining whether the first request was received within a predetermined time range after a time at which a second request for the session of the second application was received;
in response to determining that the first request was received within the predetermined time range, identifying the predetermined threshold number; and
performing the second determination based on the identified predetermined threshold number.

3. The method of claim 2 further comprises:
in response to the determining that the first request was received within the predetermined time range, recording a reception time of the first request; and
increasing the number of the consecutive calls.

4. The method of claim 2 further comprises:
in response to the determining that the first request was not received within the predetermined time range, recording a reception time of the first request; and
initializing a record of the number of the consecutive calls.

5. The method of claim 1, further comprising providing the client with a result indicating the blocking of the session of the first application.

6. The method of claim 5,
wherein the providing of the result indicating the blocking the session of the first application comprises,
in response to the session of the first application being blocked, providing information about the second application to the client in response to the blocking of the session of the first application.

7. The method of claim 1, further comprising:
in response to the second determination indicating that the number of the consecutive calls for the session of the first application is less than the predetermined threshold number, calculating a difference between the number of the consecutive calls and the predetermined threshold number; and
changing the predetermined threshold number when the calculated difference is within a predetermined range.

8. The method of claim 1, wherein the receiving of the first request further comprises determining a type of a network from which the first request was received, and
wherein the performing of the second determination comprises:
determining the predetermined threshold number based on the determined type of the network;
performing the second determination based on a first threshold number in response to determining that the type of the network is a first type; and
performing the second determination based on a second threshold number in response to determining that the type of the network is a second type.

9. A client session blocking apparatus comprising:
one or more processors;
a network interface;
a memory configured to load a computer program to be executed by the processors; and
a storage which stores the computer program,
wherein the computer program comprises instructions to perform:
an operation of receiving a first request of a client for a service, executable by one of a first application and a second application, from a web server;
an operation of performing a first determination regarding whether a session of the first application is valid in response to a session of the client being the session of the first application
an operation of performing a second determination regarding whether a number of consecutive calls for the session of the first application is equal to or greater than a predetermined threshold number in response to the first determination indicating that the session of the first application is valid; and
an operation of blocking the session of the first application and maintaining a session of the second application in response to the second determination indicating that the number of the consecutive calls is equal to or greater than the predetermined threshold number,
wherein the receiving of the first request comprises determining whether a type of a network from which the first request was received is an Internet,
wherein the performing of the second determination comprises:
in response to determining that the type of the network is the Internet, determining a first threshold number corresponding to an intranet;
generating a second threshold number based on the determined first threshold number, wherein the second threshold number is smaller than the first threshold number by a predetermined value, and
performing the second determination based on the second threshold number.

10. A non-transitory computer-readable medium configured to store a computer program which, when executed, causes a computing apparatus to:
receive a first request of a client for a service, executable by one of a first application and a second application, from a web server;
in response to a session of the client being a session of the first application, perform a first determination regarding whether the session of the first application is valid;
in response to the first determination indicating that the session of the first application is valid, perform a second determination regarding whether a number of consecutive calls for a session of the first application is equal to or greater than a predetermined threshold number and
in response to the second determination indicating that the number of the consecutive calls is equal to or greater than the predetermined threshold number, block the session of the first application, and maintaining the session of the second application,
wherein the receiving of the first request comprises determining whether a type of a network from which the first request was received is an Internet,
wherein the performing of the second determination comprises:
in response to determining that the type of the network is the Internet, determining a first threshold number corresponding to an intranet;
generating a second threshold number based on the determined first threshold number, wherein the second threshold number is smaller than the first threshold number by a predetermined value, and
performing the second determination based on the second threshold number.

* * * * *